United States Patent
Baer et al.

(10) Patent No.: US 6,343,773 B1
(45) Date of Patent: *Feb. 5, 2002

(54) SUPPORT STRUCTURE

(75) Inventors: Mark E. Baer, Trout Run, PA (US); Gary C. Berray, Port Crane, NY (US)

(73) Assignee: Shop Vac Corporation, Williamsport, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/235,093

(22) Filed: Jan. 21, 1999

(51) Int. Cl.[7] .............................................. F16M 11/00
(52) U.S. Cl. .................... 248/200; 248/349.1; 248/686; 248/608; 29/521; 29/509; 29/522.1
(58) Field of Search .............................. 248/349.1, 200, 248/686, 608; 29/521, 509, 522.1, 283.5, 243.53, 798

(56) References Cited

U.S. PATENT DOCUMENTS

| | | | |
|---|---|---|---|
| 1,571,735 A | 2/1926 | Queisser | |
| 1,734,541 A | 11/1929 | Tedman | |
| 2,165,808 A | 7/1939 | Murphy | 103/115 |
| 2,481,541 A | 9/1949 | Schneider | 103/115 |
| 2,628,419 A | 2/1953 | Wilken | 29/156.8 |
| 2,713,197 A | * 7/1955 | Schmidt | 29/432 |
| 2,767,906 A | 10/1956 | Doyle | 230/134 |
| 2,870,533 A | 1/1959 | Benham | 29/525 |
| 3,144,204 A | 8/1964 | Bohanon | 230/134 |
| 3,224,078 A | 12/1965 | Mayne | 29/156.8 |
| 3,225,422 A | 12/1965 | Sebok | 29/156.8 |
| 3,368,744 A | 2/1968 | Jenn | 230/134 |
| 3,791,016 A | 2/1974 | Eberhardt et al. | 29/432 |
| 4,130,922 A | 12/1978 | Koett | 29/243.53 |
| 4,174,559 A | 11/1979 | Persik et al. | 29/509 |
| 4,760,634 A | 8/1988 | Rapp | 29/509 |
| 4,831,704 A | 5/1989 | Rapp | 29/243.52 |
| 4,878,284 A | 11/1989 | Sawdon | 29/243.53 |
| 4,978,270 A | 12/1990 | Ackerman | 411/511 |
| 5,305,517 A | * 4/1994 | Schleicher | 29/798 |
| 5,779,309 A | * 7/1998 | Lu | 297/344.26 |
| 5,895,022 A | * 4/1999 | Kim | 248/398 |
| 5,953,809 A | * 9/1999 | Kowalski | 29/521 |
| 5,984,563 A | * 11/1999 | Wu | 403/282 |

FOREIGN PATENT DOCUMENTS

| | | |
|---|---|---|
| EP | 0 215 449 | 9/1986 |
| JP | 58-119999 | 7/1983 |

OTHER PUBLICATIONS

European Search Report for EP 00400165 dated Mar. 1, 2001.
Advertisement for "Tog–L–Loc", BTM Corporation; advertised in *Appliance*, Feb. 1998, p. 61.
Excerpts from the Tox Pressotechnik L.L.C. brochure regarding "The TOX® Joining Systems" and "The TOX® Flat Joint", pp. 4–5.
Website information for AKH, Inc. regarding the AKH FAS–NER System™ and how the system works.

* cited by examiner

*Primary Examiner*—Anita King
*Assistant Examiner*—Kimberly Wood
(74) *Attorney, Agent, or Firm*—Marshall Gerstein & Borun.

(57) ABSTRACT

A support structure includes first and second support members which are interlocked with a body. The second support member is placed in a die such that a hole of the second support member is located at a predetermined position and the body is placed on the second support member. The first support member is placed on the body such that apertures of the support members and an opening of the body are aligned. A shaping pin is then advanced toward the first support member in alignment with the predetermined position so that a shoulder of the shaping pin extends into the first support member. The shaping pin continues to advance through the first support member until a portion of the body extends past a surface of the second support member, thereby joining the first and second support members and the body together.

6 Claims, 5 Drawing Sheets

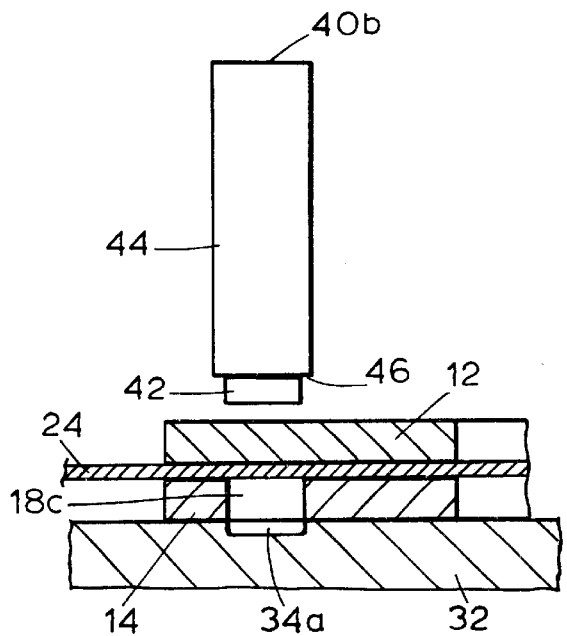
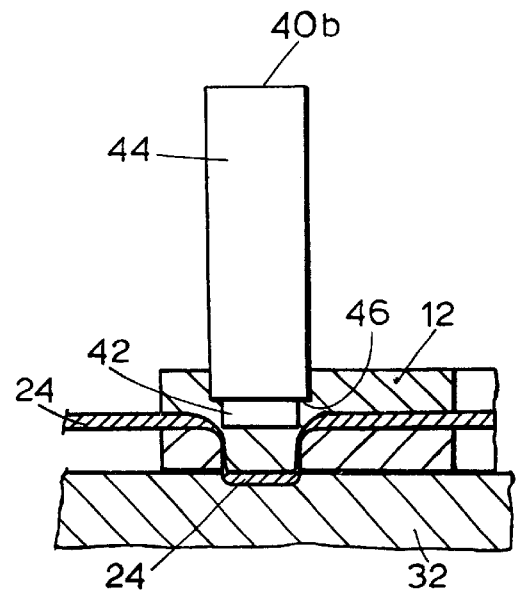
FIG. 5A    FIG. 5B
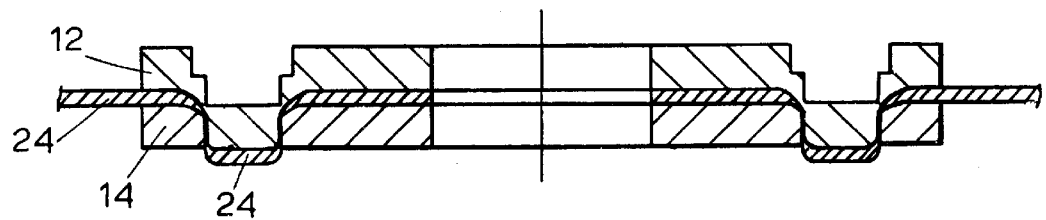
FIG. 6

SUPPORT STRUCTURE

FIELD OF THE INVENTION

The present invention relates generally to support structures, and more particularly to a support structure for a body such as an impeller and a method of making the same, for use on a rotary shaft located in the motor of a vacuum cleaner.

BACKGROUND OF THE INVENTION

Fans or impellers are well known in the art, and most are made by using rivets or other securing devices to join the support members and the impellers together. The disadvantage with this method is that additional materials and operational steps are needed to join the materials together.

In one known method of this kind as disclosed in U.S. Pat. No. 4,760,634, the plates to be joined are pressed together through a deep-drawing and swaging operation. A shaping pin draws the plates into a blind bore of a bottom die. This high compression of the plates causes the swaged material to flow radially outward. In this position, the shoulder of the shaping pin rests on the surface of the metal plate. In this known method, interlocking of the materials does not occur until the materials flow radially outward.

SUMMARY OF THE INVENTION

The present invention provides a support structure for use on impellers that are attached to a rotary shaft in the motor of a vacuum cleaner. The invention requires a simple implementation, and the materials to be joined are interlocked as soon as an upper die presses the materials together.

More particularly, in accordance with one aspect of the present invention, a support structure in combination with a body includes a first support member disposed in contact with a first side of the body and a second support member disposed in contact with a second side of the body opposite the first side. The support members include apertures that are aligned with an opening of the body to form a bore for receiving a shaft, and portions of the first support member and the body extend into a hole of the second support member to join the first and second support members and the body together.

In accordance with a preferred form of the present invention, the first and second support members have diameters smaller than the diameter of the body, and thicknesses greater than the thickness of the body. Furthermore, the second support member has a plurality of additional spaced holes each for receiving additional portions of the first support member and the body.

Also in accordance with the preferred embodiment, the second support member has a first surface in contact with the body and a second surface opposite the first surface, so that the portion of the body that extends into the hole of the second support member also extends past the second surface of the second support member. The second support member also has two additional spaced holes each for receiving additional portions of the first support member and the body.

In accordance with another aspect of the present invention, a method of assembling a support structure for a body includes providing a first support member disposed in contact with a first side of the body, providing a second support member disposed in contact with a second side of the body opposite the first side, aligning apertures of the support members with an opening of the body to form a bore for receiving a shaft, and extending portions of the first support member and the body into a hole of the second support member to join the first and second support members and the body together.

In accordance with a further aspect of the present invention, a method of securing a first support member to a second support member includes placing the second support member in a die so that a hole of the second support member is located at a predetermined position, placing the first support member adjacent to the second support member so that apertures of the support members are aligned, and advancing a shaping pin toward the first support member in alignment with the predetermined position. The shaping pin has a leading portion of a first diameter and a trailing portion of a second diameter greater than the first diameter, and the trailing portion is separated from the leading portion by a shoulder. When the shaping pin is advanced, the shoulder of the shaping pin extends into the first support member. The shaping pin is further advanced into the first support member until the first and second support members are joined together.

In accordance with another aspect of the present invention, a method of securing a body between first and second support members includes placing the second support member in a die such that a hole of the second support member is located at a predetermined position, placing the body adjacent to the second support member, placing the first support member adjacent to the body so that apertures of the support members and an opening of the body are aligned, advancing a shaping pin toward the first support member in alignment with the predetermined position so that the shoulder of the shaping pin extends into the first support member, and further advancing the shaping pin through the first support member and the body until the support members and the body are joined together.

In accordance with another aspect of the present invention, a method of securing a first support member to a second support member includes placing the second support member in a die so that a hole of the second support member is located at a predetermined position, placing the first support member adjacent to the second support member so that apertures of the support members are aligned, and advancing a shaping pin, which is of uniform cross sectional size along a full length thereof, toward the first support member in alignment with the predetermined position. When the shaping pin is advanced, the entire shaping pin extends into the first support member. The shaping pin is further advanced into the first support member until the first and second members are joined together.

In accordance with yet another aspect of the present invention, a method of securing a body between first and second support members includes placing the second support member in a die such that a hole of the second support member is located at a predetermined position, placing the body adjacent to the second support member, placing the first support member adjacent to the body so that apertures of the support members and an opening of the body are aligned, advancing a shaping pin, which is of uniform cross sectional size along a full length thereof, toward the first support member in alignment with the predetermined position so that the entire shaping pin extends into the first support member, and further advancing the shaping pin through the first support member and the body until the support members and the body are joined together.

Other features and advantages are inherent in the apparatus and methods claimed and disclosed or will become apparent to those skilled in the art from the following detailed description in conjunction with the accompanying drawings.

BRIEF DESCRIPTION OF THE DRAWINGS

FIG. 5A is a partial sectional view illustrating the support members and impeller before they are joined together;

FIG. 5B is a partial sectional view similar to FIG. 5A illustrating the support members and impeller being joined together by the shaping pin; and FIG. 6 is a sectional view of the support structure and impeller taken generally along the lines 5—5 of FIG. 2.

DETAILED DESCRIPTION OF THE INVENTION

Figure 1:
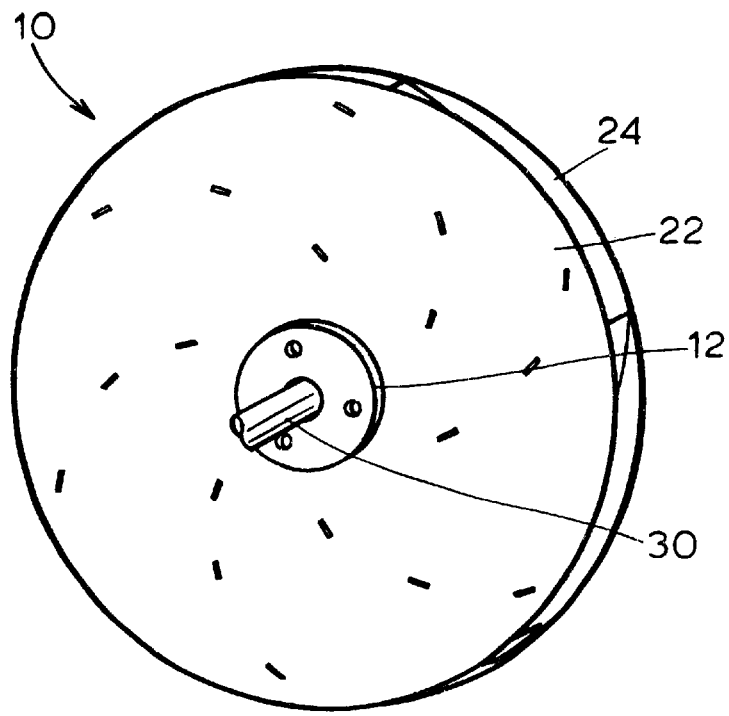
FIG. 1 is an isometric view of a first portion of the support structure of the present invention on an impeller mounted on a rotary shaft.
Figure 2:
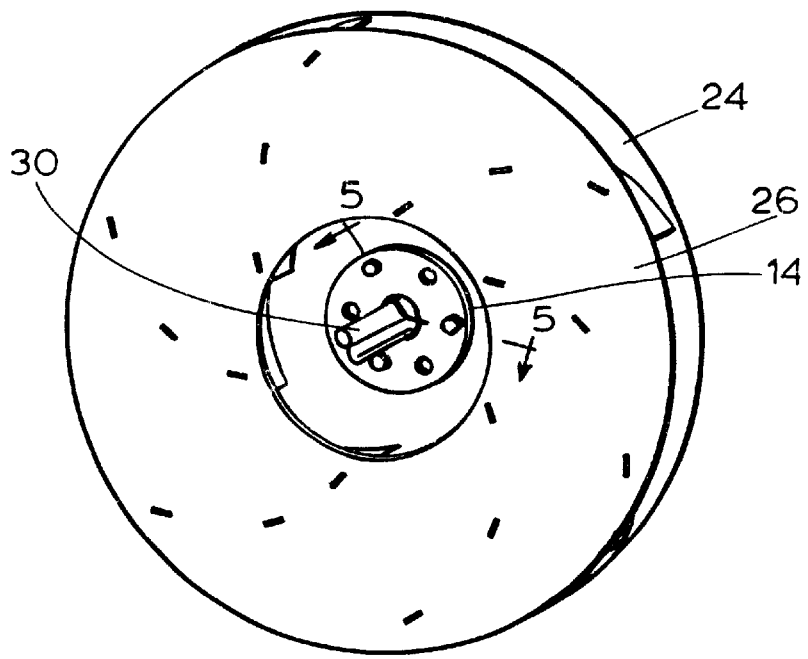
FIG. 2 is an isometric view of a second portion of the support structure of the present invention on an impeller mounted on a rotary shaft.
Figure 3:
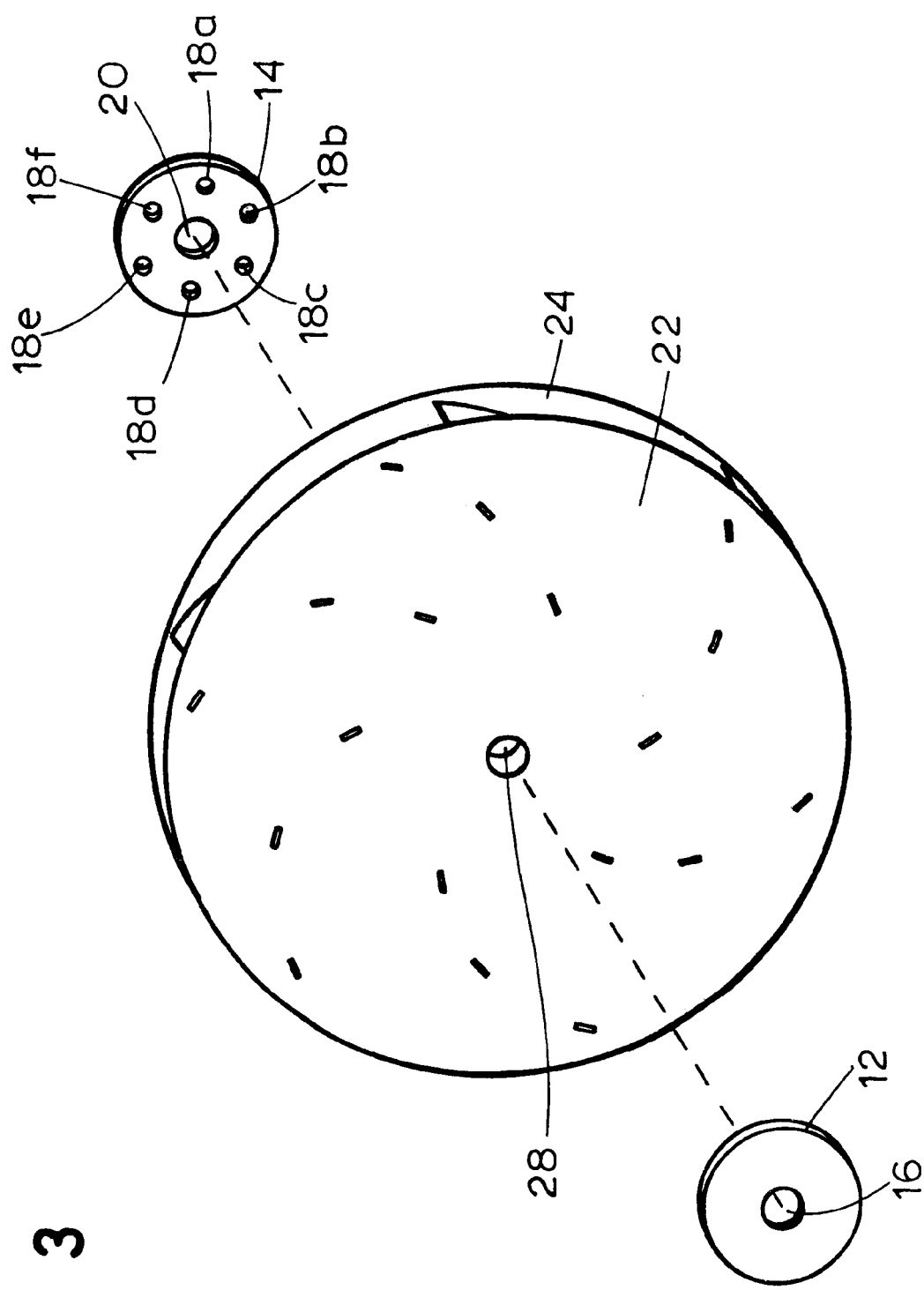
FIG. 3 is an exploded isometric view of the support members of FIGS. 1 and 2 before they are secured to the impeller.

Referring first to FIGS. 1–3, a support structure 10 in accordance with the present invention includes first and second support members 12 and 14. The first support member 12 includes an aperture 16. The second support member includes at least one, and preferably a plurality of holes 18a–18f and an aperture 20. The first support member 12 is disposed in contact with a first side 22 of a body in the form of an impeller 24. The second support member 14 is disposed in contact with a second side 26 of the impeller 24 opposite the first side 22. Apertures 16 and 20 of the first and second support members 12 and 14 are aligned with the opening 28 of the impeller 24 to form a bore for receiving a shaft 30.

Figure 4:
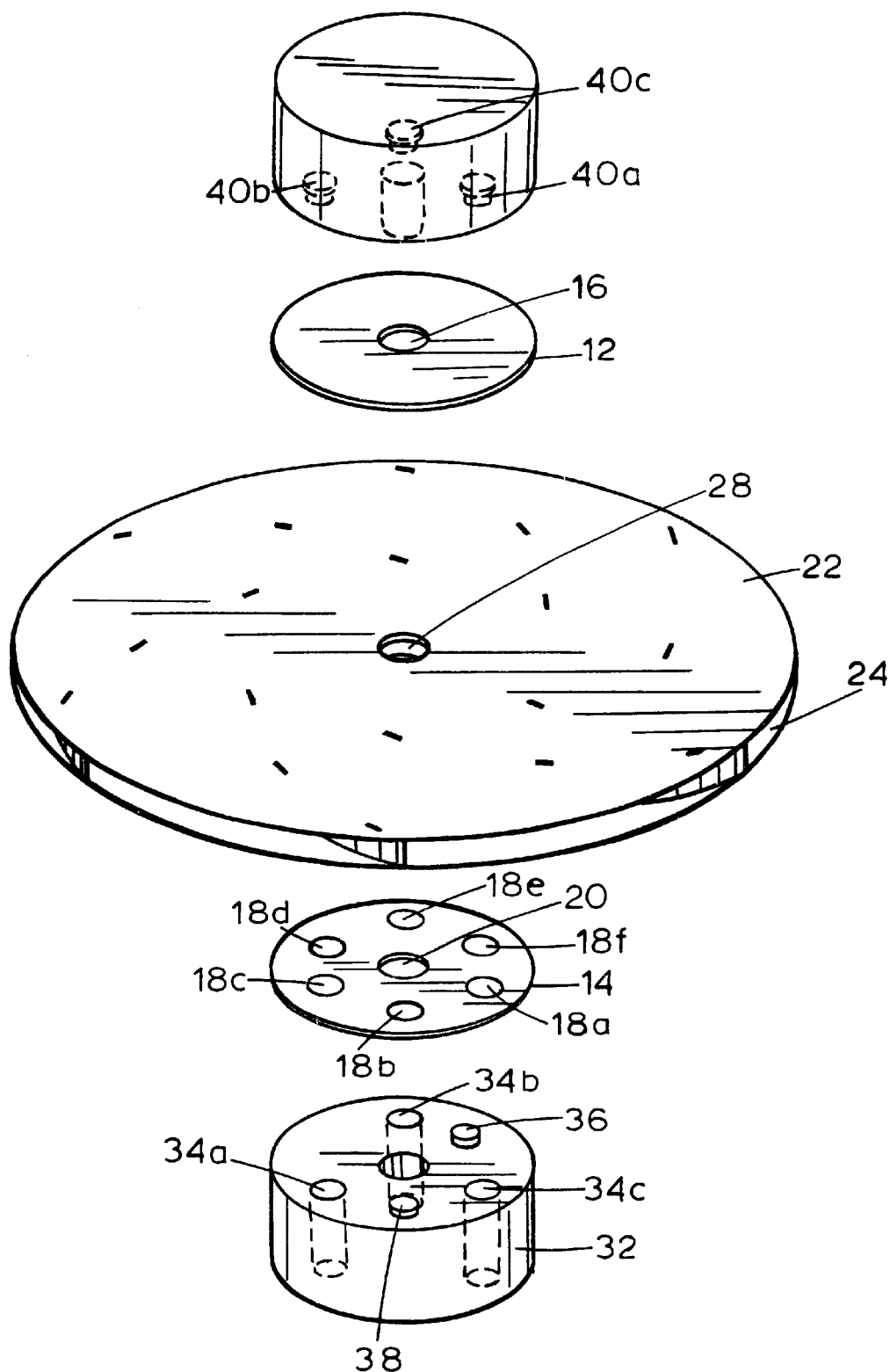
FIG. 4 is an exploded isometric view of a portion of a die in combination with one of the support members of FIGS. 1 and 2.

Referring now to FIG. 4, a die 32 contains three recesses 34a, 34b, and 34c, and locator pins 36 and 38. The second support member 14 is placed in the die 32 so that the locator pins 36 and 38 are disposed in the holes 18f and 18b. The impeller 24 is then placed atop the second support member 14 so that the opening 28 is aligned with the aperture 20. The first support member 12 is then placed atop the impeller 24 so that the aperture 16 is aligned with the opening 28. If necessary or desirable, apparatus (not shown) may be provided to prevent lateral shifting of the impeller 24 and the first support member 12.

Figure 7A:
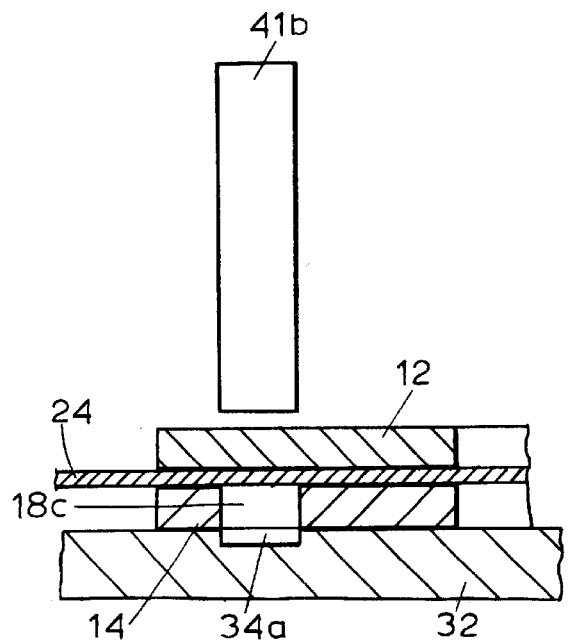
FIGS. 7A–8 are sectional views of the present invention similar to FIGS. 5A–6 showing an alternative embodiment.
Figure 7B:
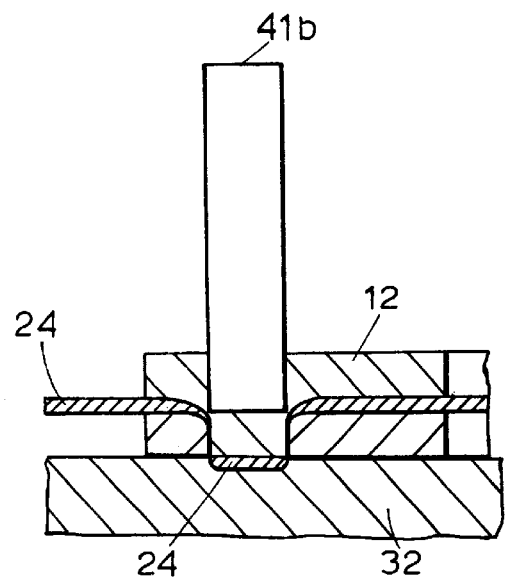
Figure 8:
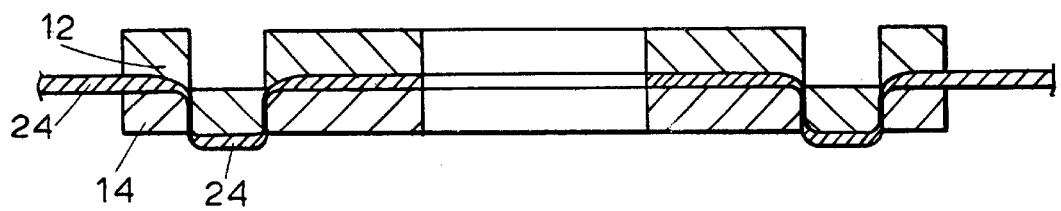

Referring now to FIGS. 5A, 5B and 6, after the various parts are assembled as noted above, at least one, and preferably three shaping pins 40a, 40b, and 40c each having a leading portion 42 and a trailing portion 44 of a greater diameter is advanced toward the first support member 12 in alignment with the holes 18a, 18c and 18e of the second support member 14. Each leading portion 42 is separated from an associated trailing portion 44 by a shoulder 46. Alternatively, as shown in FIGS. 7A, 7B and 8, the shaping pins 40a–40c are replaced by the shaping pins 41a–41c which could be of uniform cross sectional size along a full length thereof, without a leading portion 42 and trailing portion 44 separated by a shoulder 46. As each shaping pin 40a–40c is advanced toward the first support member 12, the entire shoulder 46 of each shaping pin 40a–40c extends into the first support member 12, pushing the material of the first support member 12 and the material of the impeller 24 through the holes 18a, 18c and 18e of the second support member 14. The shaping pins 40a–40c continue to advance through the first support member 12 and the impeller 24 until a portion of the impeller 24 is displaced past a surface 48 of the second support member 14 into respective recesses 34a–34c in the die 32. Once the shaping pins 40a–40c press the support members 12 and 14 and the impeller 24 together, the materials are interlocked and the support structure is formed. If desired, the portions of the impeller 24 that extend past the surface 48 of the second support member 14 can be removed by milling or any other suitable process if a flat surface is desired.

Preferably, although not necessarily, the holes 18a, 18c and 18e are equally angularly spaced, as are the shaping pins 40a–40c, so that a good mechanical interconnection is obtained. Also, a different number of holes 18 could alternatively be provided as could a different number of shaping pins 40.

The foregoing description is for the purpose of teaching those skilled in the art the best mode of carrying out the invention and is to be construed as illustrative only. Numerous modifications and alternative embodiments of the invention will be apparent to those skilled in the art in view of this description. The details of the disclosed structure may be varied substantially without departing from the spirit of the invention, and the exclusive use of all modifications within the scope of the appended claims is reserved.

What is claimed is:

1. A support structure in combination with a body wherein the body has an opening, comprising:
   a first support member disposed in contact with a first side of the body;
   a second support member having a hole, wherein the second support member is disposed in contact with a second side of the body opposite the first side;
   wherein the support members include apertures aligned with the opening of the body to form a bore for receiving a shaft therein; and
   wherein portions of the first support member and the body extend into the hole of the second support member to join the first and second support members and the body together so that relative movement of the first and second support members and the body is prevented.

2. A support structure as claimed in claim 1, wherein each of the first and second support members have a diameter smaller than a diameter of the body.

3. A support structure as claimed in claim 1, wherein each of the first and second support members have a thickness greater than a thickness of the body.

4. A support structure as claimed in claim 1, wherein the second support member has a plurality of additional equally spaced holes, each for receiving additional portions of the first support member and the body.

5. A support structure as claimed in claim 1, wherein the second support member has a first surface in contact with the body and a second surface opposite the first surface, and wherein the portion of the body that extends into the hole of the second support member extends past the second surface of the second support member.

6. A support structure as claimed in claim 1, wherein the second support member has two additional holes, and wherein the first named hole and the two additional holes are equally spaced for receiving additional portions of the first support member and the body.

\* \* \* \* \*